US009967672B2

(12) United States Patent
Rosen

(10) Patent No.: US 9,967,672 B2
(45) Date of Patent: May 8, 2018

(54) AUDIO SYSTEM

(71) Applicant: ClearMotion Acquisition I LLC, Woburn, MA (US)

(72) Inventor: Michael Rosen, Weston, MA (US)

(73) Assignee: ClearMotion Acquisition I LLC, Woburn, MA (US)

( * ) Notice: Subject to any disclaimer, the term of this patent is extended or adjusted under 35 U.S.C. 154(b) by 0 days. days.

(21) Appl. No.: 14/938,566

(22) Filed: Nov. 11, 2015

(65) Prior Publication Data

US 2017/0134837 A1 May 11, 2017

(51) Int. Cl.

*H04B 1/00* (2006.01)
*H04R 5/04* (2006.01)
*H04R 1/34* (2006.01)
*H04R 5/02* (2006.01)
*H04R 1/02* (2006.01)

(52) U.S. Cl.

CPC ............... *H04R 5/04* (2013.01); *H04R 1/345* (2013.01); *H04R 5/023* (2013.01); *H04R 2420/07* (2013.01); *H04R 2499/13* (2013.01)

(58) Field of Classification Search

CPC .... H04R 1/025; H04R 1/345; H04R 2420/07; H04R 2499/13
USPC ..................................................... 381/86, 333
See application file for complete search history.

(56) References Cited

U.S. PATENT DOCUMENTS 4,580,653 A * 4/1986 Owens ................ B60R 11/0217 181/141
5,210,802 A 5/1993 Aylward
5,809,153 A 9/1998 Aylward et al.
5,870,484 A 2/1999 Greenberger
5,887,071 A 3/1999 House
7,343,020 B2 3/2008 Thigpen
7,424,127 B1 9/2008 Holmi et al.
7,561,706 B2 7/2009 Holmi et al.
7,688,992 B2 3/2010 Aylward et al.
8,073,156 B2 12/2011 Hutt et al.
8,090,116 B2 1/2012 Holmi et al.
8,121,336 B2 2/2012 Hutt et al.
8,139,797 B2 3/2012 Aylward et al.
8,325,936 B2 12/2012 Eichfeld et al.
8,351,630 B2 1/2013 Ickler et al.
8,483,413 B2 7/2013 Hartung et al.
8,913,777 B2 12/2014 Pelliccio et al.
9,100,748 B2 8/2015 Hartung et al.
9,100,749 B2 8/2015 Hartung et al.
9,185,988 B1 * 11/2015 Sanchez .................. A47C 7/66
(Continued)

FOREIGN PATENT DOCUMENTS

DE 102008013979 A1 9/2009

OTHER PUBLICATIONS

Elliot et al., "An Active Headrest for Personal Audio", Journal of Acoustical Society of America, vol. 119, No. 5, May 2006, pp. 2702-2709.

*Primary Examiner* — Vivian Chin
*Assistant Examiner* — Ammar Hamid
(74) *Attorney, Agent, or Firm* — Wolf, Greenfield & Sacks, P.C.

(57) ABSTRACT

Seat systems and vehicle audio systems are provided. In one example, a seat system includes a seat including at least a first armrest, and a first acoustic element attached to the first armrest and configured to radiate acoustic energy to a surface in a forward facing direction of the seat.

24 Claims, 7 Drawing Sheets

(56) References Cited

U.S. PATENT DOCUMENTS

| | | | | |
|---|---|---|---|---|
| 9,451,355 | B1 | 9/2016 | Jankovsky et al. | |
| 2003/0035552 | A1 | 2/2003 | Kolano et al. | |
| 2007/0183617 | A1* | 8/2007 | Yokota | H04R 1/028<br>381/386 |
| 2008/0273722 | A1 | 11/2008 | Aylward et al. | |
| 2009/0154737 | A1* | 6/2009 | Ostler | A47C 7/72<br>381/301 |
| 2011/0163576 | A1* | 7/2011 | Akai | A47C 7/54<br>297/180.12 |

* cited by examiner

AUDIO SYSTEM

TECHNICAL FIELD

Aspects and implementations of the present disclosure are directed generally to audio systems, and in some examples, more specifically to seat-mounted acoustic elements.

BACKGROUND

Traditionally, vehicle audio systems deliver an audio signal to speakers positioned in the perimeter surfaces of a passenger of a vehicle, such as the doors or a dashboard of the vehicle. An audio signal supplied by a vehicle radio (or other signal source) is amplified, processed, and corresponding acoustic energy is delivered through the speakers to an occupant of the vehicle. In addition, speakers may be located near the ears of the occupant, such as behind the occupant in the headrest or seatback of a vehicle seat or in a rear shelf or other surface adjacent to the rear of the seat. In such systems, speakers positioned behind the head of the occupant radiate acoustic energy directly to an intended listening position of the occupant. The quality of the sound image at the listening position of the occupant depends on numerous factors, including localization of the sound image. Sound localization includes the listener's ability to identify the origin or location of the acoustic energy.

SUMMARY

In accordance with an aspect of the present disclosure, there is provided an audio system and a seat system including audio components incorporated therein. In one example, one or more acoustic elements incorporated in a seat produce sound that results in an occupant of the seat localizing elements of the sound in front of a listening position of the occupant. In particular, the one or more acoustic elements radiate acoustic energy towards a region in front of the seat to reflect the acoustic energy off a surface in front of the seat and back towards the occupant of the seat. In such an example, the one or more acoustic elements radiate substantially less acoustic energy directly at the occupant of the seat, to cause localization of a sound image in front of the occupant.

According to one aspect, provided is a seat system. In one example, the seat system includes a seat including at least a first armrest, and a first acoustic element attached to the first armrest and configured to radiate acoustic energy to a surface in a forward facing direction of the seat.

According to one example, the first acoustic element is attached to a forward facing surface of the first armrest in the forward facing direction of the seat. In an example, the first acoustic element is a first directional acoustic element. In a further example, the first directional acoustic element is a single source acoustic element coupled to a direction modifying device, the direction modifying device being configured to reflect the acoustic energy off of the surface in the forward facing direction of the seat. According to an example, the direction modifying device is a waveguide including a structure having a radiating surface with a plurality of leak openings. In a further example, the first directional acoustic element is attached to a downward facing surface of the first armrest.

According to an example, the first directional acoustic element is a multi-source array acoustic element, the multi-source array acoustic element being configured to reflect the acoustic energy off of the surface in the forward facing direction of the seat. In one example, the seat system includes a second directional acoustic element attached to a second armrest of the seat and configured to radiate acoustic energy to the surface in the forward facing direction of the seat.

According to another aspect, provided is a seat system. In one example, the seat system includes a seat including at least a base, and a first acoustic element attached to the base and configured to radiate acoustic energy to a surface in a forward facing direction of the seat.

In one example, the first acoustic element is attached to a forward facing surface of the base in the forward facing direction of the seat. According to another example, the first acoustic element is attached within the base in the forward facing direction of the seat. In one example, the first acoustic element is a first directional acoustic element. In a further example, the first directional acoustic element is a single source acoustic element coupled to a direction modifying device, the direction modifying device being configured to reflect the acoustic energy off of the surface in the forward facing direction of the seat. In a further example, the direction modifying device is a waveguide including a structure having a radiating surface with a plurality of leak openings. In one example, the first directional acoustic element is attached to a side facing surface of the base.

According to an example, the first directional acoustic element is a multi-source array acoustic element, the multi-source array acoustic element being configured to reflect the acoustic energy off of the surface in the forward facing direction of the seat. In one example, the seat system includes a second acoustic element attached to the base and configured to radiate acoustic energy to the surface in the forward facing direction of the seat.

According to another aspect, provided is a vehicle audio system. In one example, the vehicle audio system includes audio signal processing circuitry having at least a first output channel and configured to output a first output channel signal, and a first acoustic element positioned within a passenger compartment of a vehicle in front of an intended listening position of an occupant of the vehicle, the first acoustic element being configured to receive the first output channel signal and to radiate acoustic energy to a surface in a forward facing direction of the occupant.

In one example, the first acoustic element is a first directional acoustic element configured to localize an image of the radiated acoustic energy substantially in front of the occupant. According to an example, the vehicle includes a console separating at least a first seat and a second seat, and wherein the first directional acoustic element is attached to the console. In an example, the vehicle includes at least a first seat, wherein the first directional acoustic element is attached to the seat.

According to an example, the vehicle audio system includes a second acoustic element positioned within the passenger compartment of the vehicle in front of the intended listening position of the occupant of the vehicle, the second acoustic element being configured to receive the a second output channel signal and to radiate acoustic energy to the surface in the forward facing direction of the occupant. In an example, the first output channel signal includes a left output channel signal and the second output channel signal includes a right output channel signal. According to an example, the signal processing circuitry includes a wireless component, wherein the signal processing circuitry is configured to receive an audio signal via a wireless protocol through the wireless interface.

Still other aspects, examples, and advantages of these exemplary aspects are discussed in detail below. Moreover, it is to be understood that both the foregoing information and the following detailed description are merely illustrative examples of various aspects, and are intended to provide an overview or framework for understanding the nature and character of the claimed subject matter. Any example disclosed herein may be combined with any other example. References to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

Furthermore, in the event of inconsistent usages of terms between this document and documents incorporated herein by reference, the term usage in the incorporated references is supplementary to that of this document; the term usage in this document controls. In addition, the accompanying drawings are included to provide illustration and a further understanding of the various aspects and examples, and are incorporated in and constitute a part of this specification. The drawings, together with the remainder of the specification, serve to explain principles and operations of the described and claimed aspects and examples.

DETAILED DESCRIPTION

Figure 1:
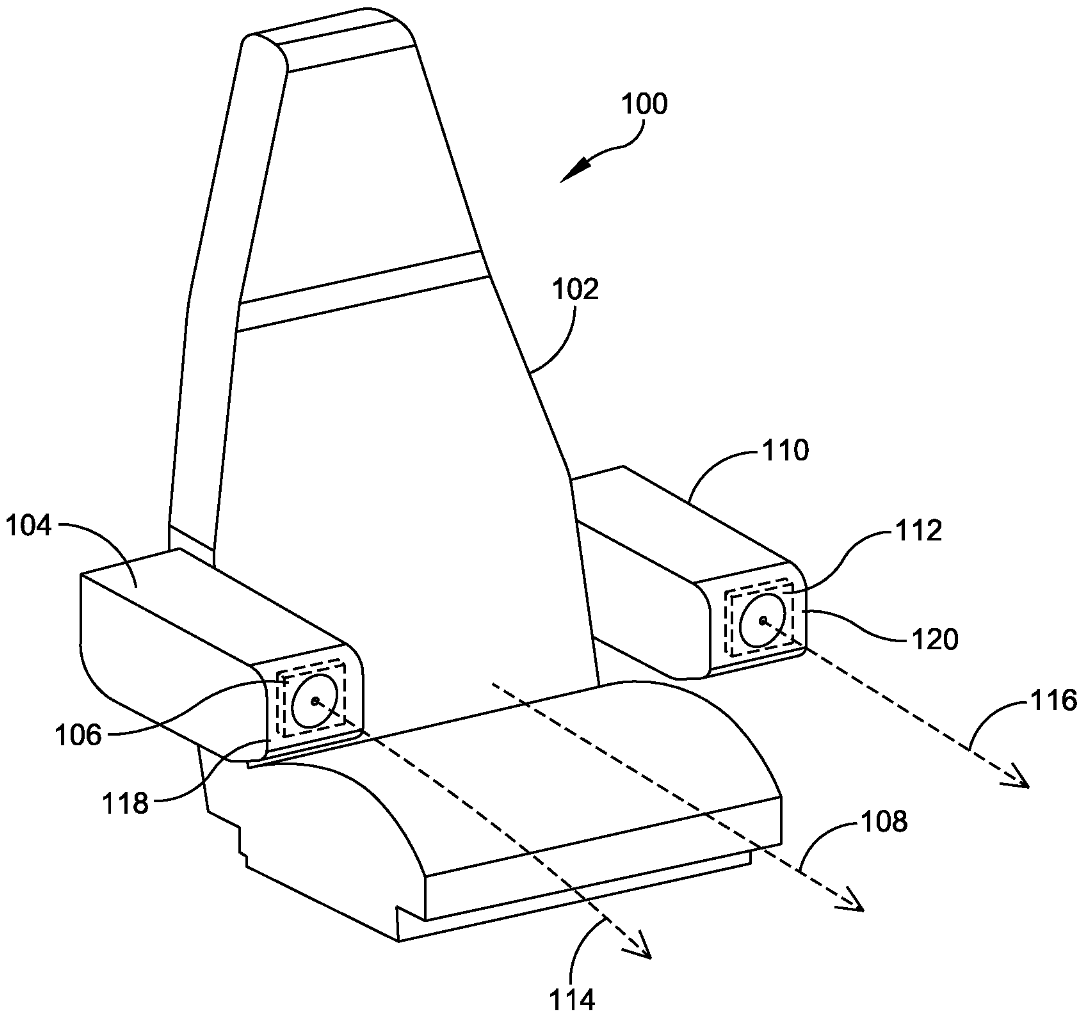
FIG. 1 is an illustration of an example seat system according to various aspects of the disclosure.

Aspects and implementations disclosed herein are not limited to the details of construction and the arrangement of components set forth in the following description or illustrated in the drawings. Aspects and implementations disclosed herein are capable of being practiced or of being carried out in various ways.

Aspects and implementations disclosed herein are generally directed to an audio system and a seat system including audio components incorporated therein. In contrast to conventional audio systems having speakers positioned in cabin-perimeter surfaces such as the dashboard or doors of a vehicle, acoustic elements of the audio system discussed herein can produce a sound image localizable in front of a listening position of a user, such as an occupant of a seat system in a vehicle, an occupant of a video gaming chair, or an occupant of a theater chair. In various aspects, the acoustic elements include directional acoustic elements constructed and arranged to radiate acoustic energy toward structures in the forward facing direction of the occupant, and to radiate substantially less acoustic energy at the occupant. Such an arrangement, facilitates localization of at least a portion of the audio information radiated by the acoustic elements in a location forward of the occupant. It is appreciated that localization of the sound image in front of the occupant improves listening experience.

Various examples discussed herein include a seat system. FIG. 1 illustrates an example seat system according an implementation. As shown in FIG. 1, the seat system 100 may include a seat 102 having at least one armrest. For example, the seat 102 may include a first armrest 104 positioned at approximately arm height of an occupant of the seat 102 at a first side of the seat. The seat system 100 may additionally include a second armrest 110 positioned at approximately the same height as the first armrest 104 at an opposite side of the seat 102. In various examples, the first armrest 104 includes a first acoustic element 106 attached to the first armrest 104 and configured to radiate acoustic energy in a forward facing direction of the seat 102. The forward facing direction of the seat 102 is indicated generally by arrow 108, and the radiation direction of the acoustic element 106 is indicated generally by arrow 114. Similarly, the second armrest 110 may include a second acoustic element 112 attached to the second armrest 110 and configured to radiate acoustic energy in the forward facing direction of the seat 102. The radiation direction of the acoustic element 112 is indicated generally by arrow 116. In FIG. 1 the first acoustic element 106 is shown attached to a forward facing surface 118 of the first armrest 106. Similarly, the second acoustic element 112 is shown attached to a forward facing surface 120 of the second armrest 110. While advantageous when the first and second acoustic element 106, 112 are substantially non-directional, in further implementations acoustic elements may be attached to any outside or interior surface of the first or second armrests 104, 110. Such implementations are further described herein. While described primarily in the context of vehicles and vehicle seats, it is appreciated that the seat system 100, and seat 102, may include other seats or chairs. For example, in one implementation the seat system 100 may include a movie theater seat, a desk chair, or a gaming chair.

In various examples, the first acoustic element 106, second acoustic element 112, and/or other acoustic elements described herein with reference to FIGS. 1-7, may include a directional acoustic element. Directional acoustic elements include acoustic elements that radiate more acoustic energy in some directions than in others. In one example, the directional acoustic element may include a multi-source array acoustic element. Individual sources of the multi-source array may include any acoustic energy source, such as speakers, loudspeakers, and transducers. While, individual acoustic energy sources of one example may include a cone-type acoustic driver, other types of loudspeakers may be used. In a multi-source array, the pressure waves radiated by the sources destructively interfere, so that the multi-source array radiates more or less energy in different directions depending on the degree of destructive interference that occurs. The directions in which relatively more acoustic energy is radiated, for example, directions in which the sound pressure level is within 6 dB (preferably between −6 dB and −4 dB, and ideally between −4 dB and −0 dB) of the maximum sound pressure level (SPL) in any direction at points of equivalent distance from the directional acoustic element, will be referred to as "high radiation directions." The directions in which less acoustic energy is radiated, for example, directions in which the SPL is a level at least −6 dB (preferably between −6 dB and −10 dB, and ideally at a level down by more than 10 dB, for example −20 dB) with respect to the maximum in any direction for points equidistant from the directional acoustic element, will be referred to as “low radiation directions”.

Multi-source array acoustic elements have at least two acoustic energy sources, and may have more than two. Increasing the number of acoustic energy sources increases the control over the radiation pattern of multi-source array acoustic element, for example by permitting control over the radiation pattern in more than one plane. The multi-source array acoustic elements shown in the figures show the location of, but do not necessarily show the number of, or the orientation of, the acoustic energy sources. The number of and the orientation of the acoustic energy sources and signal processing necessary to produce directional radiation patterns may be done by employing the techniques described in U.S. Pat. No. 5,870,484, titled “LOUDSPEAKER ARRAY WITH SIGNAL DEPENDENT RADIATION PATTERN”, and U.S. Pat. No. 5,809,153, titled “ELECTROACOUSTICAL TRANSDUCING”, which are hereby incorporated by reference herein in their entirety. Directional loudspeakers in a vehicle are discussed in U.S. Pat. No. 8,325,936, titled “DIRECTIONALLY RADIATING SOUND IN A VEHICLE”, which is hereby incorporated by reference herein in its entirety.

As discussed herein, directional acoustic elements may also include a single source acoustic element coupled to a direction modifying device. The single source may include any acoustic energy source, such as a speaker, loudspeaker, or transducer. While the single source of one example may include a cone-type acoustic driver, other types of loudspeakers may be used. In various implementations, the direction modifying device is a waveguide including a structure having a radiating surface with a plurality of leak openings. The acoustic energy source is configured to receive an audio signal (e.g., output channel signal) and radiate acoustic energy along a length of the structure. The structure is configured and arranged to allow the acoustic energy to leak through the leak openings in a controlled manner. In various examples leak openings include a resistive mesh or other acoustically resistive material. Each hole in the mesh acts as an individual sound source. Leak openings may be continuous, or include a series of discrete leaks aligned along the length of the structure. The direction modifying device leaks acoustic energy in a radiation direction along the structure. The structure of the direction modifying device may be defined by any shape, such as an elongate pipe, a fan, a wedge, an elongate rectangle, or any other arbitrary shape. Similarly, the leak openings may be arranged on any surface of the structure. In one particular implementation, the structure may be defined by a semi-circular shape including leak openings along a circumference of the semi-circular shape. Such an implementation permits radiation of acoustic energy without a phase delay. Further implementations and orientations of the directional acoustic elements referenced herein may include the acoustic apparatus described in U.S. Pat. No. 8,351,630, titled “PASSIVE DIRECTIONAL ACOUSTICAL RADIATING,” which is hereby incorporated by reference herein in its entirety. Various configurations of the of the one or more acoustic elements of one example will be discussed in further detail below with reference to FIGS. 3*a*-3*b*, 4*a*-4*b*, 6*a*-6*b*, and 7.

Figure 2:
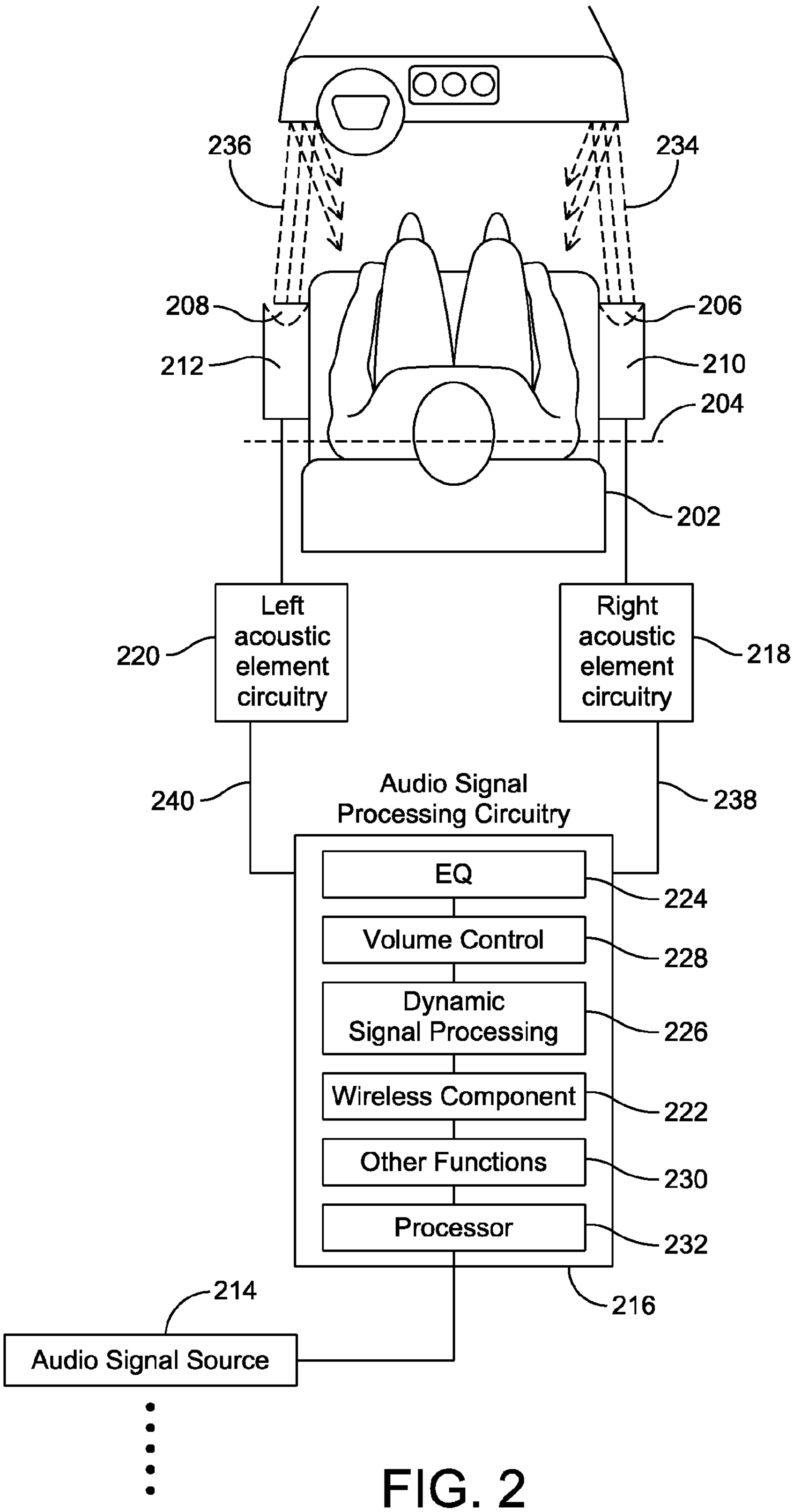
FIG. 2 is an illustration of an example audio system according to various aspects of the disclosure.

FIG. 2 shows a diagram of a vehicle passenger compartment with an audio system according to various aspects discussed herein. The passenger compartment includes at least one seat 202, such as a vehicle seat. Associated with the seat 202 is an intended listening position of the occupant (indicated generally as axis 204). Associated with the seat 202 is at least a first acoustic element 206. In further aspects, a second acoustic element 208 may be associated with the seat 202. In one implementation, each acoustic element 206, 208 is positioned to radiate acoustic energy towards cabin perimeter surfaces located in front of the intended listening position of the occupant of the seat 202. The first acoustic element 206 and second acoustic element 208 are shown in FIG. 2 as single source acoustic elements for the sake of explanation only, and may include directional acoustic element as discussed above. The first acoustic element 206 may be positioned in a right side armrest 210, in a base of the seat 202 (obscured in FIG. 2 by the occupant), along an outer surface of the base of the seat 202, along the side of the seat 202, along a door, or in some other similar location generally on the right side of the seat 202, such as a console between the seat 202 and a second seat. Similarly, the second acoustic element 208 may be positioned in the left side armrest 212, in the base of the vehicle seat 202, along the side of the vehicle seat 202, along a door, or in some other similar location generally on the left side of the seat 202. In another implementation, each acoustic element may be positioned in front of, behind, or at, the intended listening position axis 204 of the occupant of the seat 202. Accordingly, in various examples, the first acoustic element 206 and the second acoustic element 208 may be attached to any surface of the armrest or base, although particular surfaces may be preferred. While shown in FIG. 2 as including a first and a second acoustic element 206 and 208, in further implementations the audio system may include a third, fourth, or any further acoustic element.

In various implementations, the first acoustic element 206 and second acoustic element 208 are arranged so that the radiation patterns are oriented in the forward facing direction toward structures in front of the occupant. For instance, this may include the windshield, the dashboard, the foot well, the steering wheel, or other structures positioned in front of an occupant of a vehicle. FIG. 2 shows the audio signal radiated from the first acoustic element 206 (dotted lines 234) and the audio signal radiated from the second acoustic element 208 (dotted lines 236) reflected from the dashboard in front of the occupant. In contrast to conventional audio systems which radiate audio signals directly at a listener, the radiation pattern of the acoustic elements 206 and 208 is arranged such that reflections of the acoustic energy from the structures positioned in front of an occupant assist the occupant in localizing the sound image of the acoustic energy in front of the occupant. This may include positioning the first and/or second acoustic element 206 and 208 such that the radiation away from the occupant and towards the front facing direction of the occupant is a high radiation direction, and the radiation towards the occupant is a low radiation direction.

The audio system of FIG. 2 is shown as receiving an audio signal from one or more audio signal sources 214. While in one implementation, the audio signal source may be integral to the system, such as a vehicle radio; in several implementations, audio signal processing circuitry 216 of the audio system may receive the audio signal from any audio signal source external to the audio system. The audio signal processing circuitry shown in FIG. 2 is coupled to acoustic element specific circuitry (e.g., right acoustic element circuitry 218 and left acoustic element circuitry 220). The acoustic element specific circuitry is coupled to the one or more acoustic elements, respectively. The acoustic element specific circuitry, or the audio signal processing circuitry 216, or both, may also include integration circuitry for integrating the one or more acoustic elements with other speakers in the vehicle passenger compartment. For example, the integration circuitry may include a system interface configured to couple the audio system with a vehicle sound system, a gaming sound system, or a home entertainment sound system. For instance, acoustic element specific circuitry or the audio signal processing circuitry 216 may be coupled to one or more speakers, located about a cabin of the vehicle, such as in the dashboard, in a door, or in a center console. While shown in FIG. 2 as an exploded view, in various aspects, the acoustic element specific circuitry and audio signal processing circuitry 216 are incorporated within the seat 202. Further implementations of a standalone vehicle audio system included within a vehicle seat are described below with reference to FIG. 7.

In operation, the audio signal processing circuitry 216 receives the audio signal received from the audio signal source 214 and provides an audio signal (e.g., output channel signal) to the one or more acoustic elements (e.g., first acoustic element 206 and second acoustic element 208) via an output channel. In one example, the signal is first processed by the left acoustic element circuitry 220 and right acoustic element circuitry 218 accordingly. The audio signal provided to the first acoustic element 206 and second acoustic element 208 may be simple stereo signals, such as a right output channel signal and a left output channel signal. However, in other implementations, the audio signals provided to the first acoustic element 206 and second acoustic element 208 can be composite signals down-mixed from a multi-channel source, such as a surround encoded audio signal down-mixed to a composite left output channel signal and a composite right output channel signal. Accordingly, in several implementations, the audio signals presented to the acoustic elements 206 and 208 may be monophonic, may be a left channel and a right channel of a stereophonic signal, or a right channel and a left channel or right surround channel and left surround channel of a multi-channel audio signal. Acoustic element specific circuitry, such as the left acoustic element circuitry 220 and the right acoustic element circuitry 218, may apply a combination of phase shift, polarity inversion, delay, attenuation, and other signal processing to the audio signal. Further implementations and signal processing techniques to cause the acoustic elements 206 and 208 that include a multi-source array acoustic element to achieve a desired radiation pattern are described in U.S. Pat. No. 5,870,484, titled "LOUDSPEAKER ARRAY WITH SIGNAL DEPENDENT RADIATION PATTERN", and U.S. Pat. No. 5,809,153, titled "ELECTROACOUSTICAL TRANSDUCING", which are hereby incorporated by reference herein in their entirety.

In various aspects, the first acoustic element 206 and the second acoustic element 208 include a directional acoustic element, as described above. The directional nature of the directional acoustic elements of one example has various effects. One effect is that the acoustic energy radiated from the directional acoustic elements in the forward facing direction of the occupant has a significantly higher amplitude in front of the occupant than acoustic energy radiated directly at the occupant. When localizing a sound image, an occupant will generally localize the source of the sound based on a direction of arrival of a first wavefront. Various examples shift this localization to a position in front of the occupant by adjusting the level of radiation in a particular direction (e.g., the forward facing direction of the occupant). Although reflection of the acoustic energy from a surface in front of the occupant arrives later than direct radiation from the acoustic element, the level of acoustic radiation in the forward facing direction is much greater, shifting the sound image to a position in front of the occupant. Accordingly, in various examples the occupant localizes to the later arriving reflection from the surface in front of the occupant, not any earlier arriving direct acoustic radiation. A sound image localized in front of the person creates a more robust and fuller listening experience and improves the quality of the sound perceived by the listener.

With continuing reference to FIG. 2, signal processing circuitry may receive the audio signal from any audio signal source 214. While not shown in FIG. 2, in one example the audio signal source may include a cell phone, a mobile device, an MP3 player, a CD player, or one or more components of a vehicle sound system. The audio source 214 may be integral to the audio system or external and operate independent the audio system. The audio signal from the audio signal source 214 is received and a corresponding audio signal, such as a channel output signal, is transmitted to the acoustic elements 206 and 208 so that the occupant of the seat 202 listens to the music or other audio information supplied by the audio signal source 214. In one example, the audio signal processing circuitry 216 may include a wireless component 222 including an interface configured to receive the audio signal via a wireless protocol. For example, the audio signal processing circuitry 216 can include a wireless component 222 having hardware or software configured to receive the audio signal via a wireless protocol such as BLUETOOTH®, Bluetooth Low Energy (BLE), WiFi, Zigbee, or Propriety Radio. As used herein, BLUETOOTH® refers to a short range ad hoc network, otherwise known as piconets. In particular, BLE offers the benefit of reduced power consumption and cost. In various examples, BLE communication is structured as a series of "services" composed of "characteristics". In further examples, the wireless component may include hardware or software to support both BLUETOOTH® and Bluetooth Low Energy. For simplicity, in FIG. 2 some of the features are shown as coupled by single lines. The single lines may represent a plurality of channels, for example a left and right channel of a stereophonic system or as a plurality of channels in a multichannel system. For example, line 238 may represent a right output channel and the line 240 may represent a left output channel. FIG. 2 also shows each audio signal source being radiated for only one seating position. In other implementations, the acoustic elements 206 and 208 may radiate the audio signal to localize a sound image in front of a second, third, or any other occupant of a vehicle.

In addition to providing audio signals to the acoustic elements 206 and 208, the audio signal processing circuitry 216 may perform other functions. For example, if there is an equalization pattern associated with a particular audio source, the audio signal processing circuitry 216 may apply the equalization pattern to the audio signal from the associated audio signal source. If desired, the equalization patterns may be different depending on the audio source. For example, if the occupant is listening to a cell phone message, the equalization pattern may be appropriate for voice. If the occupant is listening to music, the equalization pattern may be appropriate for music. Accordingly, the audio signal processing circuitry 216 may include an equalizer 224, dynamic signal processing circuitry 226, volume control circuitry 228, other functions circuitry 230 (which includes other signal processing functions for example, noise cancellation), and a processor 232. In operation, the equalizer 224, the dynamic signal processing circuitry 226, the volume control circuitry 228, the other functions circuitry 230, and the processor 232, of audio signal processing circuitry 216 processes the audio signal from the audio signal source 214. For example, the dynamic signal processing circuitry 226 may perform compression, limiting, or any other time varying gain and/or frequency response modifying processes. For instance, the components of the signal processing circuitry 216 may delay a desired frequency range of the audio signal, such as mid-frequency range, relative to other frequencies of the audio signal to create a time delay between emission of the desired frequency range and the other frequencies of the audio signal.

The processor 232 may include any processor, multiprocessor, or controller. The processor 232 may be further connected to a memory and a data storage element. The memory stores a sequence of instructions coded to be executable by the processor 232 to perform or instruct the various components discussed herein to perform the functions described in this disclosure. Thus the memory may be a relatively high performance, volatile random access memory such as a dynamic random access memory (DRAM) or static memory (SRAM). However, the memory may include any device for storing data, such as a disk drive or other nonvolatile storage device.

As shown in FIG. 2, various implementations of the audio system may include an acoustic element positioned within an armrest (e.g., first acoustic element 206 positioned within first armrest 210). In such implementations, the armrest may be rotatably mounted to the seat 202 and configured to rotate in and out of the arm space of the occupant of the seat 202. Notably, displacement of the armrest may adversely influence the radiation direction of the acoustic element attached thereto. Accordingly, in various examples, the audio signal processing circuitry 216 further includes circuitry, such as the dynamic signal processing circuitry 226, configured to adjust the audio signal as a function of armrest position. For example, the dynamic signal processing circuitry 226 may reduce the amplitude of the audio signal in a predetermined frequency range responsive to placing the armrest in an upward facing direction or at a particular angle. For example, the armrest may include an accelerometer or any other position sensor coupled and in communication with audio signal processing circuitry 216. Responsive to detection of displacement or movement to a particular angle by the accelerometer or position sensor, the audio signal processing circuitry 216 may instruct the dynamic signal processing circuitry 226 to modify or completely cancel the audio signal. Alternatively, additional components of the audio signal processing circuitry 216, such as the equalizer 224 of one implementation, may processes the audio signal to compensate for displacement of the armrest or movement to a particular angle. In further examples, similar techniques may be applied to detected movement of the seat 202 (e.g., occupant moves a positioning of the seat closer to the dashboard). For example, the dynamic signal processing circuitry 226 may adjust the audio signal as a function of the seat position along a vertical, a first horizontal, or a second horizontal axis (i.e., x, y, and z axis).

Figure 3A:
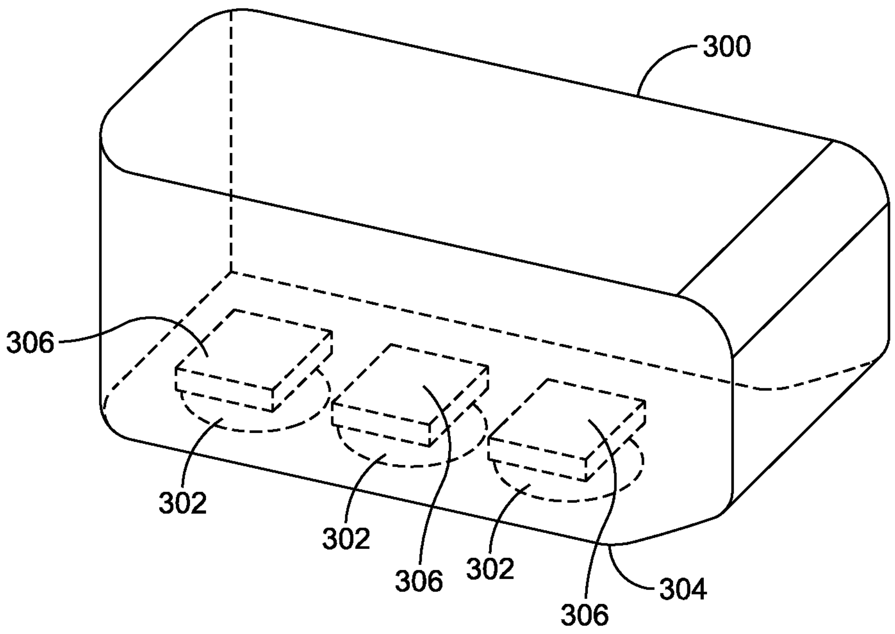
FIGS. 3*a* and 3*b* are example configurations of an armrest according to various aspects of the disclosure.
Figure 3B:
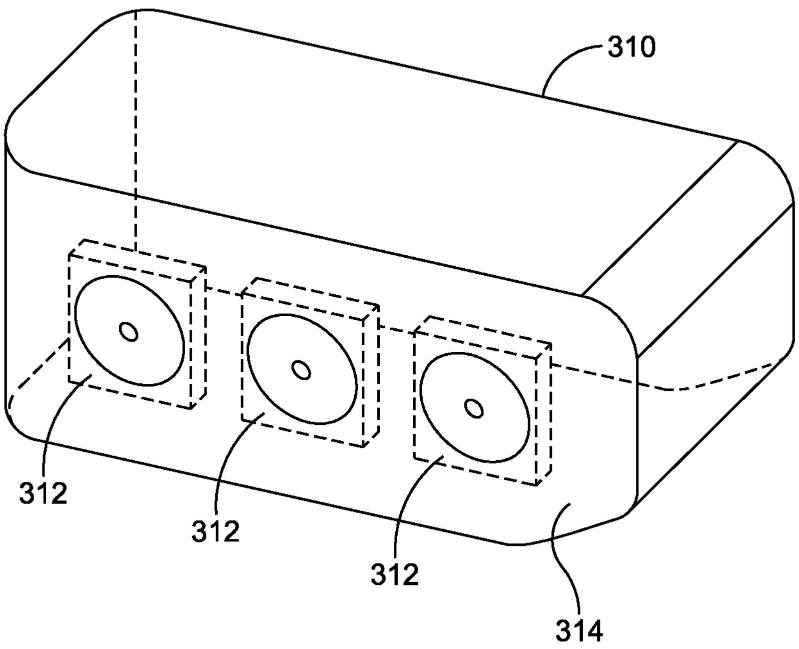

Turning now to FIGS. 3*a* and 3*b*, various configurations of an acoustic element attached to an armrest according to various aspects of the disclosure are shown. FIG. 3*a* shows an armrest 300 having a directional acoustic element 302 attached to a downward facing surface 304 of the armrest 300. The downward facing surface 304 may include the surface of the armrest 300 facing a floor of the vehicle. The directional acoustic element 302 is shown in FIG. 3*a* as a multi-source array acoustic element. In particular, the shown multi-source array includes three acoustic energy sources. Each acoustic energy source includes a back enclosure 306, which is positioned to prevent acoustic energy radiating in a rearward direction of the acoustic energy source. In one implementation, the acoustic energy sources may share a back enclosure. While shown in FIG. 3*a* as including three acoustic energy sources, various further implementations may include two or more acoustic energy sources. Signals may be provided to individual acoustic energy sources of the multi-source array acoustic element such that their outputs destructively interfere with each other, as discussed above. The individual acoustic energy sources of the multi-source array acoustic element may be positioned on other single surfaces, or multiple surfaces, of the armrest 300. FIG. 3*b* shows one such alternative arrangement.

FIG. 3*b* shows an armrest 310 having a directional acoustic element 312 attached to a side facing surface 314 of the armrest 300. Similar to the arrangement of FIG. 3*a*, the directional acoustic element 312 is shown in FIG. 3*b* as a multi-source array acoustic element. Signals are provided to individual acoustic energy sources of the multi-source array acoustic element such that their outputs destructively interfere with each other, as discussed above.

Figure 4A:
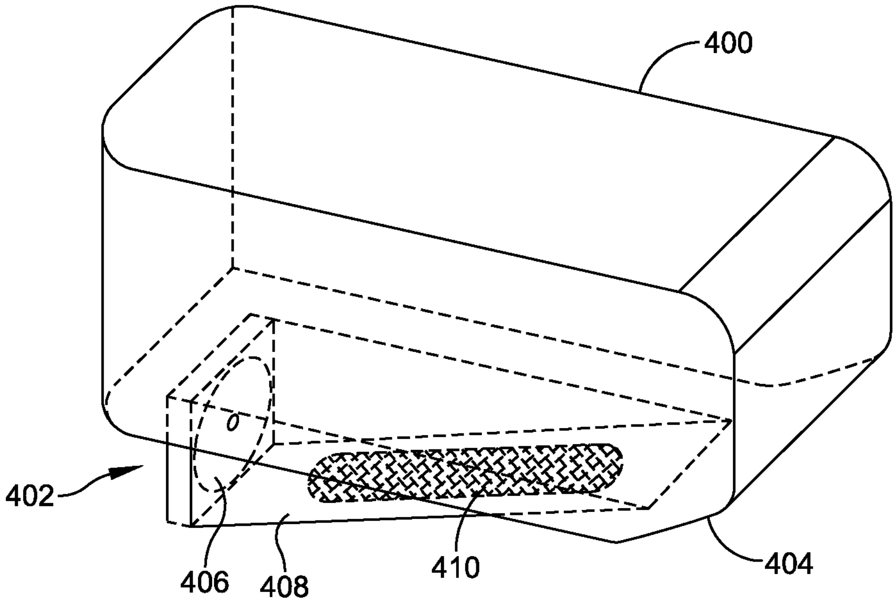
FIGS. 4*a* and 4*b* are further example configurations of an armrest according to various aspects of the disclosure.
Figure 4B:
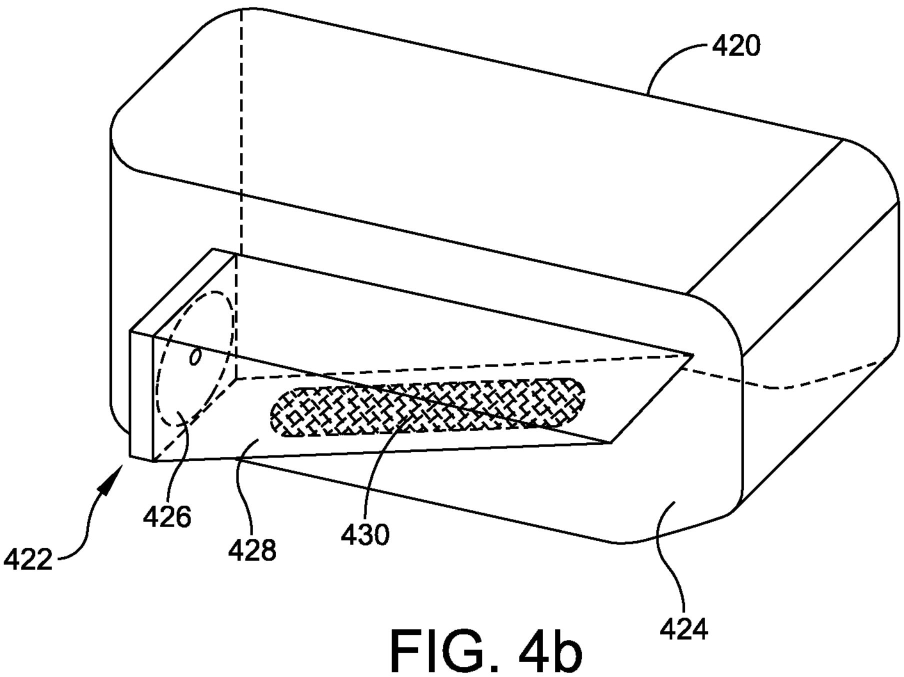

Turning now to FIGS. 4*a* and 4*b*, various configurations of an acoustic element attached to an armrest according to various aspects of the disclosure are shown. FIG. 4*a* shows an armrest 400 and a directional acoustic element 402 attached to a downward facing surface 404 of the armrest 400. The directional acoustic element 402 includes a single source acoustic element coupled to a direction modifying device. While in one implementation, the direction modifying device may include any direction modifying device, such as a horn or corn, in the shown implementation, the direction modifying device includes a waveguide including a structure 408 having leak openings 410. The directional acoustic element 402 is disposed along a length of the armrest 400. The single source 406 is configured to receive an audio signal (e.g., output channel signal) and radiate acoustic energy along a length of the structure 408. The structure 408 is constructed and arranged to allow the acoustic energy to leak through the leak openings 410 in a controlled manner. While the armrest 400 is shown as defined by a substantially level planar downward facing surface 404, in at least one implementation the downward facing surface 404 is shaped to tilt the directional acoustic element 402 at an angle in an upward direction increasing from a back of the armrest 400 to a front of the armrest 400. Such an arrangement may permit direction of acoustic energy radiated from the directional acoustic element 402 at a windshield of a vehicle. The directional acoustic element 402 may be positioned on other single surfaces of the armrest 400. FIG. 4*b* shows one such alternative arrangement.

FIG. 4*b* shows an armrest 420 having a directional acoustic element 422 attached to a side facing surface 424 of the armrest 420. Similar to the arrangement of FIG. 4*a*, the directional acoustic element 422 is shown in FIG. 4*b* including a single source acoustic element coupled to a direction modifying device. In the shown implementation, the single source 426 is coupled to a structure 428 having leak openings 430. Acoustic energy radiated along a length of the structure 428 leaks through the leak openings 430 in a controlled manner, as discussed above.

It is to be appreciated that a single armrest is shown in FIGS. 3*a*-3*b* and 4*a*-4*b* for the sake of simplicity. In further examples, the audio system and seat system according to various aspects discussed herein may include a second armrest (e.g., a corresponding left or right armrest) including the various features described above with reference to FIGS. 3*a*-3*b* and 4*a*-4*b*.

Figure 5:
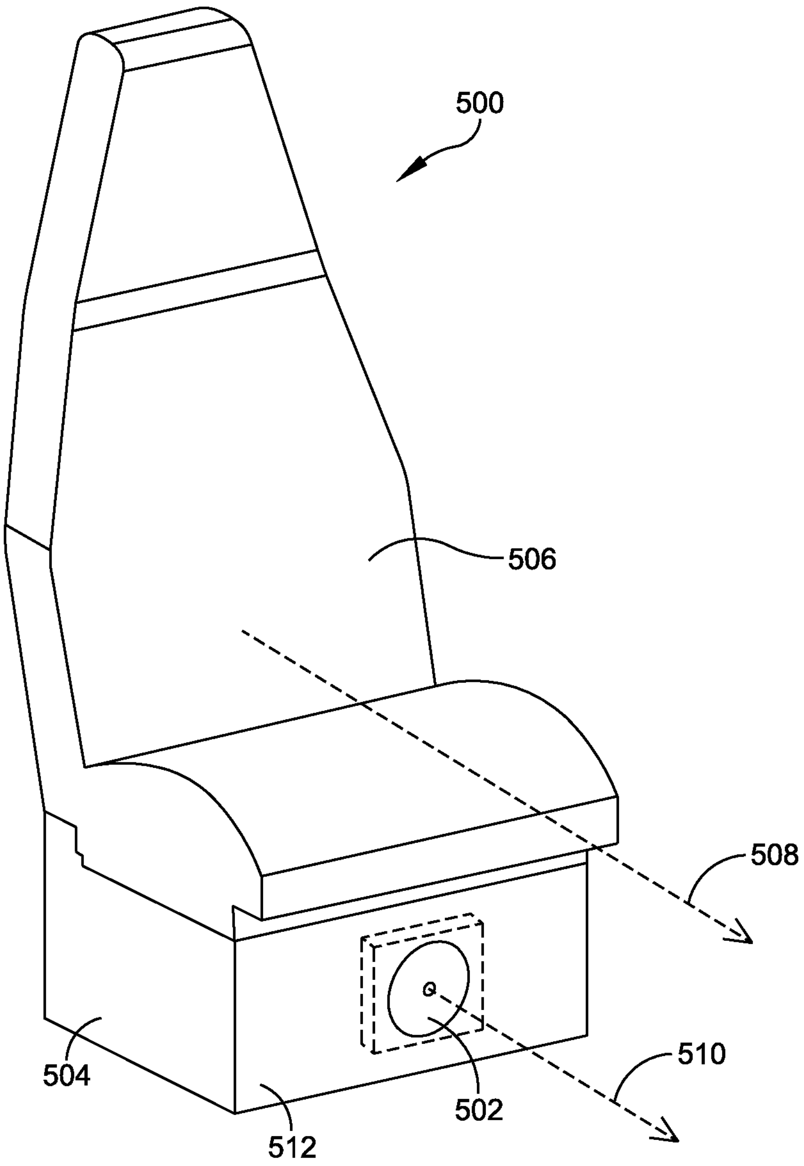
FIG. 5 is an illustration of an example seat system according to various aspects of the disclosure.

While various examples of the seat system discussed herein include one or more armrests including an acoustic element among other features, in various examples one or more acoustic elements may be attached to a base of a seat in addition to, or alternative to, the one or more acoustic elements positioned in an armrest. FIG. 5 illustrates an example seat system 500 according to such implementations. It is to be appreciated that in some situations the surrounding environment may not permit two armrests, or even a single armrest. Accordingly, the seat system 500 includes one or more acoustic element 502 attached to a base 504 of a seat 506. The acoustic element 502 is configured radiate acoustic energy to a surface in a forward facing direction of the seat 506 to localize a sound image in front of an occupant of the seat 506. The forward facing direction of the seat 506 is indicated generally by arrow 508, and the radiation direction of the acoustic element 502 is indicated generally by arrow 510. In various examples, the base 504 may include an active or passive suspension system configured to move relative to a floor of the vehicle during travel. In several aspects and implementations, the acoustic element 502 may include a directional acoustic element such as the single source acoustic element coupled to a direction modifying device or the multi-source array acoustic element discussed above.

In FIG. 5, the acoustic element 502 is shown attached to a forward facing surface 512 of the base 504. While advantageous when the acoustic element 502 is substantially non-directional, in further implementations the one or more acoustic element 502 may be attached to any outside or interior surface of the base 504. Such implementations are further described herein with reference to FIGS. 6*a* and 6*b*. While described primarily in the context of vehicles and vehicles seat, it is appreciated that the seat system 500, and seat 506, may include other seats and chairs.

In various implementations, the one or more acoustic element 502 is arranged so that the radiation pattern is oriented in the forward facing direction toward structures in front of the occupant. For instance, structures may include the windshield, the dashboard, the foot well, the steering wheel, or other structures positioned in front of an occupant of a vehicle. In contrast to conventional audio systems which radiate audio signals directly at a listener, the radiation pattern of the acoustic element 502 is arranged such that reflections of the acoustic energy from the structures positioned in front of an occupant assist the occupant in localizing the sound image of the acoustic energy in front of the occupant. This may include positioning the one or more acoustic element 502 such that the radiation away from the occupant and towards the front facing direction of the occupant is a high radiation direction, and the radiation towards the occupant is a low radiation direction. In various implementations, the system 500 includes audio signal processing circuitry such as the audio signal processing circuitry 216 discussed above with reference to FIG. 2.

Figure 6A:
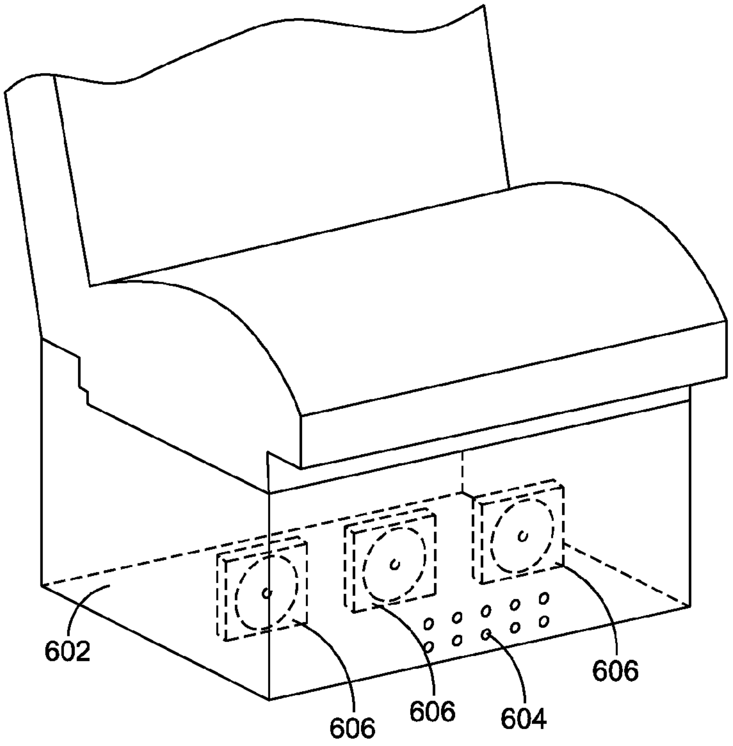
FIGS. 6*a* and 6*b* are example configurations of a seat system base according to various aspects of the disclosure.
Figure 6B:
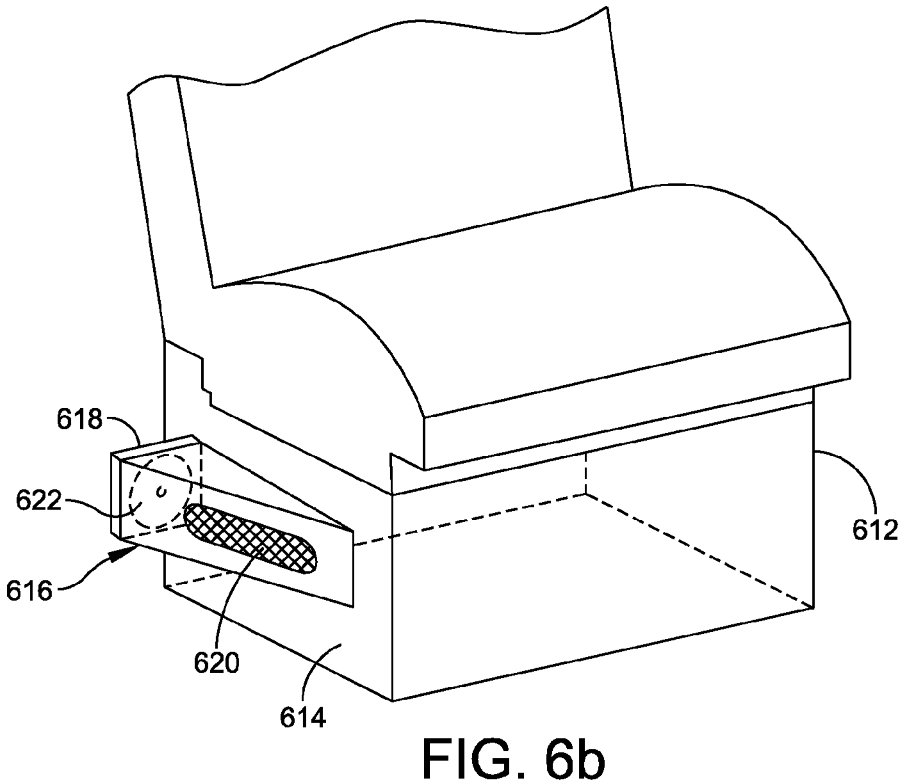

Turning now to FIGS. 6*a* and 6*b*, various configurations of an acoustic element attached to a base of a seat system are shown. FIG. 6*a* shows a base 602 having a directional acoustic element 606 attached to an interior surface of the base 602. The directional acoustic element 606 is shown in FIG. 6*a* as a multi-source array acoustic element. In particular, the multi-source array includes three acoustic energy sources, although two or more may be used. Signals may be provided to individual acoustic energy sources of the multi-source array acoustic element such that the output of each source destructively interferes, as discussed above. In various implementations, the base 602 defines one or more opening 604 in the forward facing direction of the seat which permits the radiated acoustic energy to pass through the base 602. The opening 604 is shown in FIG. 6*a* as an array of holes; however, any opening may be used, such as a hole covered by a grate, mesh screen, or other protective material.

The individual acoustic energy sources of the multi-source array acoustic element may be positioned on other single surfaces, or multiple surfaces, of the base 602. For example, in a particular implementation where the base 602 encloses an active or passive suspension system, there may not be adequate space within the base 602 to attach the one or more directional acoustic element 602. Accordingly, the directional acoustic element 602 may be attached to a side facing surface of the base 602. Furthermore, FIG. 6*a* only illustrates one directional acoustic element attached to the seat base 602. In several implementations a second directional acoustic element may be attached to the base 604. For example, this may include a second directional acoustic element attached to a second side facing surface of the base 604. When attached to a forward facing surface of the base 604, or the side facing surface of the base 604, the one or more directional acoustic element 606 may be attached at a fixed positioned relative to a position of the seat. In such an implementation, movement of the seat does not have an effect on the radiation direction of the directional acoustic element 606.

Turning now to FIG. 6*b*, shown is a base 612 having a directional acoustic element 616 attached to a side facing surface 614 of the base 612. The directional acoustic element 616 is shown as a single source acoustic element coupled to a direction modifying device. While in one implementation, the direction modifying device may include any direction modifying device, such as a horn or cone, in the shown implementation the direction modifying device includes a waveguide including a structure 618 having leak openings 620. The directional acoustic element is disposed along a length of the base 612. The single source 622 is configured to receive an audio signal (e.g., output channel signal) and radiate acoustic energy along a length of the structure 618. The structure 618 is configured and arranged to allow the acoustic energy to leak through the leak openings 620 in a controlled manner in the forward facing direction of the seat. The directional acoustic element 616 may be positioned on other single surfaces of the base 614.

While FIG. 6*b* only illustrates one directional acoustic element attached to the seat base 612, in several implementations a second directional acoustic element may be attached to the base 604. For example, this may include a second directional acoustic element attached to a second side facing surface of the base 604. The second side facing surface is substantially opposite the side facing surface on which the directional acoustic element 616 is shown attached. View of the second side facing surface of the base 612 is obscured in FIG. 6*b* by the forward facing surface of the base 612. When attached to a forward facing surface of the base 604, or the side facing surface 614 of the base 612, the one or more directional acoustic element 616 may be attached at a fixed positioned relative to a position of the seat. In such an implementation, movement of the seat does not have an effect on the radiation direction of the directional acoustic element 606.

Figure 7:
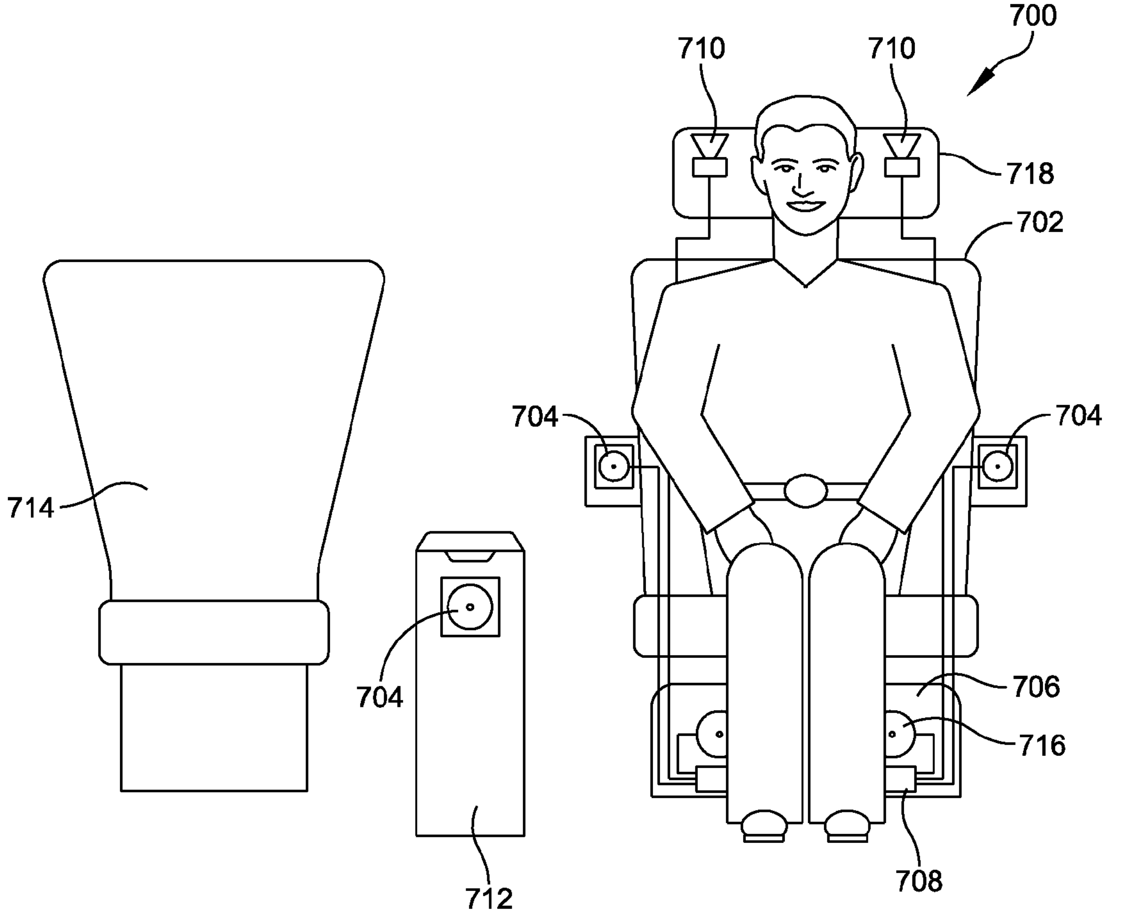
FIG. 7 is an example configuration of an audio system according to various aspects of the disclosure.

Turning now to FIG. 7, shown is an example configuration of an audio system incorporated into a seat according to various aspects of the disclosure. The system 700 shown includes everything necessary to provide audio to an occupant of the seat 702. The system 700 includes a seat 702, acoustic elements 704, and a bass sound source 706. The system 700 may also include audio signal processing circuitry 708 and additional acoustic elements 710. As shown in FIG. 7, the acoustic elements 704 may be attached to armrests of the seat 702, or attached to a center console 712 positioned between the seat 702 and a second seat 714. In further examples, acoustic elements 704 may be positioned at other locations relative to the seat 702, such as in a door of a vehicle cabin. In various implementations, the acoustic elements 704 are coupled to and in communication with the audio signal processing circuitry 708, for example via one or more output channels, such as a left output channel and right output channel.

In various implementations, the one or more acoustic elements 704 receive an audio signal from the signal processing circuitry 708 corresponding to music or other audio information to be conveyed to the occupant. The one or more acoustic elements 704 are arranged to radiate acoustic energy so that the radiation pattern is oriented in the forward facing direction toward structures in front of the occupant. For instance, this may include the windshield, the dashboard, the foot well, the steering wheel, or other structures positioned in front of an occupant of a vehicle. In contrast to conventional audio systems which radiate audio signals directly at a listener, the radiation pattern of the acoustic elements 704 are arranged such that reflections of the acoustic energy from the structures positioned in front of an occupant assist the occupant in localizing the sound image (e.g., music or audio information) of the acoustic energy in front of the occupant. This may include positioning the acoustic elements 704 such that the radiation away from the occupant and towards the front facing direction of the occupant is a high radiation direction, and the radiation towards the occupant is a low radiation direction. In various implementations, the acoustic elements 704 include directional acoustic elements such as those discussed above (e.g., a multi-source array acoustic element or a single source acoustic element coupled to a direction modifying device), and the audio signal processing circuitry 708 includes the audio signal processing circuitry 216 discussed above with reference to FIG. 2.

FIG. 7 shows the bass sound source 706 including one or more bass speakers 716 attached to a base of the seat 702. It is appreciated that low frequency audio signals are largely non-directional and will have minimal impact on localization of the sound image of the audio signal. Accordingly, while in one implementation the bass speakers 716 may include direction modifying devices to radiate acoustic energy in a forward facing direction of the seat 702, in other implementations the bass speakers 716 are substantially non-directional. In a particular implementation, the bass sound source 706 may further include a base shield positioned substantially around an outside surface of the bass sound source 706. The bass shield is positioned so as to substantially enclose the bass sound source 706 positioned within the base of the seat 702.

FIG. 7 also shows the system 700 as optionally including additional acoustic elements 710. For example, additional acoustic elements 710 may be positioned in a headrest 718 of the seat 702. While shown in FIG. 7 as removable from the seat 702, in various examples the headrest 718 may be integral to the seat 702. The additional acoustic elements 710 may be positioned to localize a sound image in the forward facing direction of the seat 702 or in a rearward facing direction of the seat 702. The rearward facing direction is substantially opposite the forward facing direction of the seat 702.

Accordingly, various aspects and implementations discussed herein provide a complete standalone audio system incorporated into a seat. While the seat of various examples may include a vehicle seat, in several implementations the seat includes any seat or chair such as a desk chair, a gaming seat, an entertainment seat, or a theater seat. Accordingly, various aspects discussed herein may be adapted to retrofit a vehicle seat, chair, desk chair, gaming seat, entertainment seat, or theater seat. In other aspects, examples discussed herein may be included within an original equipment manufacturer (OEM) vehicle seat, chair, desk chair, gaming seat, entertainment seat, or theater seat.

Having thus described several aspects of at least one implementation, it is to be appreciated various alterations, modifications, and improvements will readily occur to those skilled in the art. Such alterations, modifications, and improvements are intended to be part of this disclosure, and are intended to be within the spirit and scope of the disclosure. One or more features of any one example disclosed herein may be combined with or substituted for one or more features of any other example disclosed. Accordingly, the foregoing description and drawings are by way of example only.

The phraseology and terminology used herein is for the purpose of description and should not be regarded as limiting. As used herein, the term "plurality" refers to two or more items or components. As used herein, dimensions which are described as being "substantially similar" should be considered to be within about 25% of one another. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A seat system comprising:

a vehicle seat including at least a first armrest positioned at a first side of the vehicle seat and a second armrest positioned at a second side of the vehicle seat;

a first directional acoustic element attached to the first armrest, the first directional acoustic element including a first single source acoustic element coupled to a first waveguide, wherein the first waveguide includes a first structure having a first radiating surface with a plurality of leak openings positioned along a length of the first radiating surface; and a second acoustic element attached to the second armrest, the first directional acoustic element and the second acoustic element each being configured to radiate acoustic energy to a surface in a forward facing direction of the vehicle seat to localize an image of the radiated acoustic energy substantially in front of an intended listening position of an occupant of the vehicle seat, wherein the first directional acoustic element is configured to radiate the acoustic energy along the length of the first radiating surface and leak the acoustic energy through the leak openings in the forward facing direction of the vehicle seat.

2. The seat system according to claim 1, wherein the second acoustic element is attached to a forward facing surface of the second armrest in the forward facing direction of the vehicle seat.

3. The seat system according to claim 1, wherein the first directional acoustic element is attached to a downward facing surface of the first armrest.

4. The seat system according to claim 1, wherein the second acoustic element is a second directional acoustic element.

5. The seat system of claim 1, wherein the vehicle seat includes a base; and the seat system further comprises a third acoustic element attached to the base and configured to radiate acoustic energy to the surface in the forward facing direction of the vehicle seat.

6. The seat system according to claim 5, wherein the third acoustic element is attached to a forward facing surface of the base in the forward facing direction of the vehicle seat.

7. The seat system according to claim 5, wherein the third acoustic element is attached within the base in the forward facing direction of the vehicle seat.

8. The seat system according to claim 5, wherein the third acoustic element is a second directional acoustic element.

9. The seat system according to claim 8, wherein the second directional acoustic element is a second single source acoustic element coupled to a direction modifying device, the direction modifying device being configured to reflect the acoustic energy off of the surface in the forward facing direction of the vehicle seat.

10. The seat system according to claim 9, wherein the direction modifying device is a second waveguide including a second structure having a second radiating surface with a plurality of leak openings.

11. The seat system according to claim 10, wherein the second directional acoustic element is attached to a side facing surface of the base.

12. The seat system according to claim 8, wherein the second directional acoustic element is a multi-source array acoustic element, the multi-source array acoustic element being configured to reflect the acoustic energy off of the surface in the forward facing direction of the vehicle seat.

13. The seat system according to claim 5, further comprising a fourth acoustic element attached to the base and configured to radiate acoustic energy to the surface in the forward facing direction of the vehicle seat.

14. A vehicle audio system comprising:

a seat including at least a first armrest;

audio signal processing circuitry having at least a first output channel and configured to output a first output channel signal; and a first directional acoustic element attached to the first armrest in front of an intended listening position of an occupant of the vehicle, the first directional acoustic element including a first single source acoustic element coupled to a first waveguide, wherein the first waveguide includes a first structure having a first radiating surface with a plurality of leak openings positioned along a length of the first radiating surface, and wherein the first directional acoustic element is configured to receive the first output channel signal, radiate acoustic energy along the length of the first radiating surface, and leak the acoustic energy through the leak openings to a surface in a forward facing direction of the occupant, wherein the audio signal processing circuit is configured to adjust, within a frequency range, an amplitude of the first output channel signal based on a position of the armrest.

15. The vehicle audio system according to claim 14, wherein the first directional acoustic element is configured to localize an image of the radiated acoustic energy substantially in front of the occupant.

16. The vehicle audio system according to claim 15, wherein the vehicle includes a console separating at least the seat and another seat, and the vehicle audio system further comprises a second directional acoustic element attached to the console.

17. The vehicle audio system according to claim 14, further comprising a second acoustic element positioned within a passenger compartment of the vehicle in front of the intended listening position of the occupant of the vehicle, the second acoustic element being configured to receive a second output channel signal and to radiate acoustic energy to the surface in the forward facing direction of the occupant.

18. The vehicle audio system according to claim 17, wherein the first output channel signal includes a left output channel signal and the second output channel signal includes a right output channel signal.

19. The vehicle audio system according to claim 14, wherein the signal processing circuitry includes a wireless component, wherein the signal processing circuitry is configured to receive an audio signal via a wireless protocol through the wireless interface.

20. The vehicle audio system according to claim 14, further comprising a position sensor to detect the position of the armrest, wherein the audio signal processing circuitry is configured to reduce the amplitude of the first output channel signal responsive to placement of the armrest in an upward facing direction.

21. The seat system according to claim 1, wherein the plurality of leak openings includes an acoustically resistive material.

22. The seat system according to claim 4, wherein the second directional acoustic element is a multi-source array acoustic element, the multi-source array acoustic element being configured to reflect the acoustic energy off of the surface in the forward facing direction of the seat.

23. The seat system according to claim 4, wherein the second directional acoustic element is a second single source acoustic element coupled to a second direction modifying device, the second direction modifying device being configured to reflect the acoustic energy off of the surface in the forward facing direction of the seat.

24. The vehicle audio system according to claim 14, wherein the plurality of leak openings includes an acoustically resistive material.

* * * * *